United States Patent [19]

Santoro

[11] Patent Number: 5,230,304
[45] Date of Patent: Jul. 27, 1993

[54] ANIMAL TREATMENT AND HANDLING DEVICE

[76] Inventor: Vincent J. A. Santoro, 220 Strong Rd., Ferndale, N.Y. 12734

[21] Appl. No.: 16,844

[22] Filed: Feb. 12, 1993

[51] Int. Cl.$^5$ .............................................. A01K 29/00
[52] U.S. Cl. .................................... 119/156; 119/19
[58] Field of Search ............... 119/156, 193, 158; 224/202, 205; 383/41, 97

[56] References Cited

U.S. PATENT DOCUMENTS

| | | | |
|---|---|---|---|
| 3,150,640 | 9/1964 | Nevitt | 383/41 X |
| 4,644,902 | 2/1987 | Doyle | 119/19 |
| 4,977,857 | 12/1990 | Slawinski | 119/19 |
| 5,170,745 | 12/1992 | Burdette, Jr. | 119/19 |

FOREIGN PATENT DOCUMENTS

| | | | |
|---|---|---|---|
| 628296 | 10/1961 | Canada | 119/19 |
| 323157 | 12/1929 | United Kingdom | 119/158 |

*Primary Examiner*—Gene Mancene
*Assistant Examiner*—Thomas Price
*Attorney, Agent, or Firm*—Sandra M. Kotin

[57] ABSTRACT

An animal treatment and handling device which is a flexible enclosure or case into which the animal can be placed. The animal is secured up to its neck by hook-and-loop type fastening strips located on either side of the front opening and which provide a quick closure. Only the head of the animal extends without the case. A second closure adds strength and helps to seal the case so that it can be used for bathing or dipping the animal. The case has a reclosable slit along the top through which medication can be introduced or the animal can be treated. D-rings are provided to affix a carrying strap to the case for transporting the animal.

10 Claims, 2 Drawing Sheets

ANIMAL TREATMENT AND HANDLING DEVICE

FIELD OF THE INVENTION

The instant invention relates to a device to be used to treat, bathe and transport animals. With the device, the animal's movements can be contained and restricted such that the handler is able to perform the necessary manipulations without being scratched or bothered. The device permits a variety of treatments to the animal without having to tie or bind the animal's limbs.

BACKGROUND OF THE INVENTION

Many animal owners have had difficulties treating their animals, even with a procedure as simple as applying flea powder or giving the animal a bath. Some dogs are easier to work with than others, but cats have proven to be most difficult. With the increasing spread of Lyme disease throughout the United States, all animals allowed to run loose out of doors must be either dusted with flea powder or dipped in a medicated bath on a regular basis.

Cats are never cooperative for any procedure, and are often impossible to handle when water or topical medication is involved in the treatment.

There have been no means to effectively assist the individual pet owner in providing treatment to his animal. Veterinarians have special tables with means to restrain an animal by a rope at its neck or with straps across the limbs and/or torso. The instant invention bridges the gap between no restraint and complete restraint. It can be used by any animal owner, animal handler or veterinarian. It can also be used with wild animals of manageable size and can make tagging, treating, inoculating and transporting non-domesticated animals much easier.

The instant invention provides a means to fully enclose all of the animal except its head in a flexible waterproof container. An opening in the top permits the introduction of the medication and gives the handler access to the animal's entire body.

BRIEF SUMMARY OF THE INVENTION

The present invention relates to an enclosure into which an animal is placed with only its head remaining outside. The enclosure is completely flexible so that the animal can be treated with medication and held as tightly as necessary while remaining within the enclosure.

It is an object of the present invention to provide a device which makes treatment of small animals simple and safe for anyone, without the necessity of special training.

Another object of the present invention is to provide a means by which medication can be applied evenly over an animal's entire body.

It is another object of the present invention to provide a means to treat an animal such that the handler cannot be scratched or clawed during treatment.

Another object of the present invention is to enable the even distribution of powder or other medication to the animal's entire body without getting any of the substance on the handler, into the animal's eyes, or into the atmosphere.

A still further object of the present invention is to provide a means to bathe or dip the animal whereby the handler does not get wet or exposed to the treating solution.

Another object of the present invention is to have the device collapsible and portable so as to place an animal inside with ease, enable secure transport of an animal within the device, and store the device in a small space.

A further object of the present invention is to provide a device that is easy and inexpensive to manufacture, but is durable and cannot be easily damaged by the animal's claws.

Further objects and advantages of the present invention will become apparent from the description of the preferred embodiments.

DETAILED DESCRIPTION OF THE INVENTION

Figure 1:
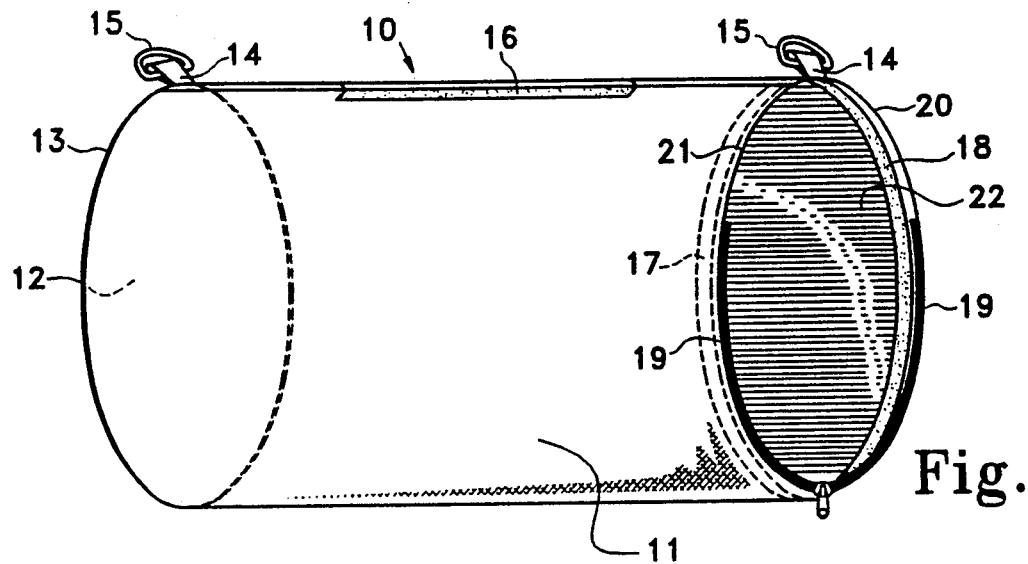
FIG. 1 is a perspective view of a preferred embodiment of the device of the present invention.
Figure 2:
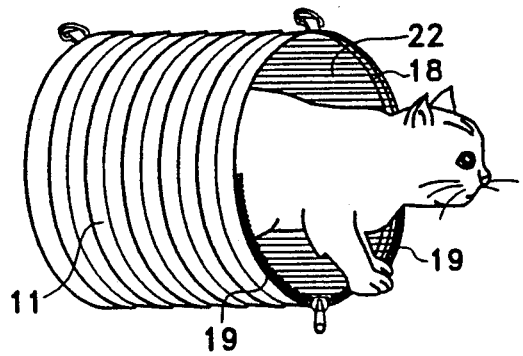
FIG. 2 is a perspective view of the device of FIG. 1 partially collapsed and ready to receive the animal.

The animal treatment and handling device consists of a flexible enclosure or case 10, as can be seen in FIG. 1, which has a back end panel 12, preferably round, with reinforced binding 13 to provide a semirigid framework from which extends a flexible tubular portion 11 forming the walls of the case. The tubular portion 11 can be easily collapsed for storage or to receive an animal. The round back end panel 12 and reinforced binding 13 help to maintain the shape of the case when the animal is inside and also when the tubular walls of the case are collapsed to receive the animal. (FIGS. 2 and 3) The case 10 is constructed of two layers, not illustrated. The outer layer is a heavy, strong, flexible material made of a fiber such as cotton or nylon, or a plastic, and the inner layer or lining is a heavy gauge waterproof substance which may be vinyl or other polymeric material. The lining should be strong enough to withstand the clawing of the animal.

Figure 3:
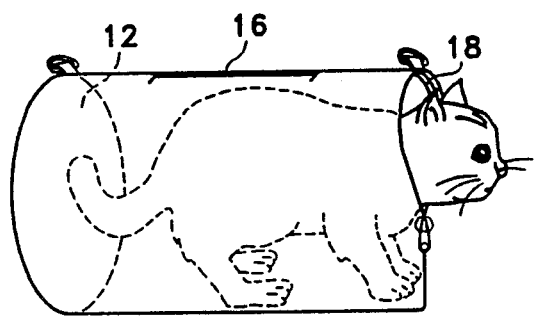
FIG. 3 is a side view of the device showing the animal inside and ready for treatment.
Figure 5:
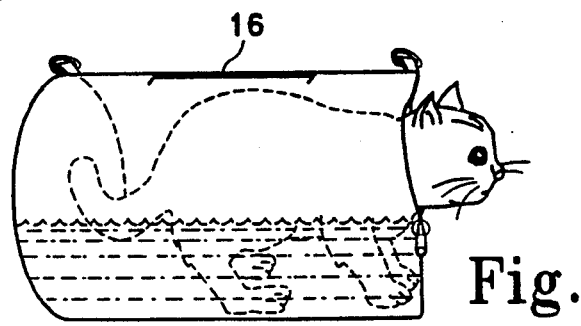
FIG. 5 is a side view of the device showing an animal inside with water or other solution with which to treat the animal.

There is no panel at the front end of the case and the front ends 20 and 21 of the tubular portion 11 are brought together to close the front opening 22. There is a strip of first mating connector 17 located along the entire length of the inside of the right front end and a strip of second mating connector 18 located along the entire length of the inside of the left front end. A zipper 19 is affixed at the lower two-thirds of the periphery of the front ends 20 and 21. The first mating connector 18 is a strip of hook-type fastener and the second mating connector 18 is a strip of loop-type fastener. The two are sold under the trade name "Velcro" and coact to close the front opening 22. The hook-and-loop type fastening strips 17 and 18 enable the front ends 20 and 21 to be brought together and closed quickly around the animal's neck as it is placed inside the case 10. Only the head of the animal remains outside the case 10 as seen in FIG. 3. The zipper 19 provides a stronger closure which can be fastened after the animal is securely and properly positioned. The zipper 19 also serves to seal the front opening 22 and to maintain a liquid bath inside the enclosure when such is being used. This can be seen in FIG. 5. A series of snap fasteners and receivers can be used in place of the zipper.

Figure 4:
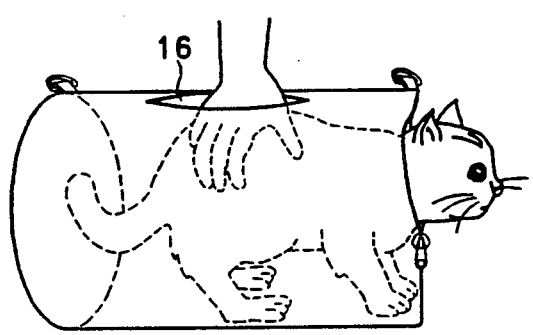
FIG. 4 is a side view of the device showing the animal inside and the top opened with a person's hand reaching inside to treat the animal.

There is a longitudinal slit 16 located in the center of the top of the case (see FIG. 1). The right and left edges of the slit 16 are fitted with strips of first mating connector and second mating connector respectively. The mating connectors are hook-type and loop-type fastening strips. These enable the user to open and close the slit 16 and to reach easily inside the case 10 to treat the animal, as seen in FIG. 4. The slit may also be closed with snap fasteners and receivers or a zipper.

Figure 6:
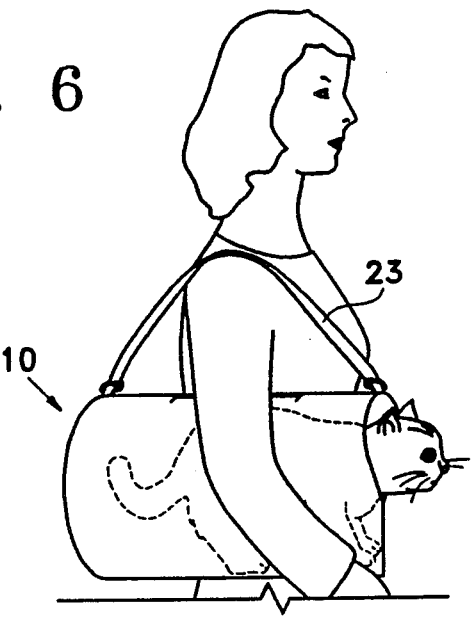
FIG. 6 is a side view of the device with the animal inside and being safely and securely carried by a handler.

Two loops 14, each holding a D-ring 15, are situated at either end of the top of the case (FIG. 1) for communication with a carrying strap 23 (FIG. 6).

Since the case 10 is flexible, once a medication, powder or liquid, is placed inside, the case itself may be squeezed or otherwise manipulated to apply the medication to all parts of the animal. Additionally, since the animal's paws are safely within the case 10, the head or face of the animal may be treated or cleaned with no danger of the handler being scratched. A muzzle may be used to protect against animal bites if necessary. The animal may easily be carried within the case 10 and the handler cannot be scratched or clawed (FIG. 6).

A second embodiment of the animal treatment and handling device of the present invention, the blanket case 24, can be formed from a single oblong or rectangle of lined fabric, the blanket 25. The outer fabric and waterproof liner are stitched together along the perimeter or are likewise sealed, or the two layers may be laminated throughout. The blanket 25 is divided in half longitudinally and there is a strip of first mating connector 26 running all along the inside perimeter of one half of the blanket and a strip of second mating connector 27 running all along the inside perimeter of the other half of the blanket. The first mating connector 26 can be a hook-type fastening strip and the second mating connector 27 can be a loop-type fastening strip. These hook-and loop type fastening strips are marketed under the trade name "Velcro". When the two halves of the blanket 25 are brought together, the two the two strips coact and permit the blanket 25 to be closed and sealed around the animal. Strips holding a series of snap closures can also be used to close and seal the blanket 25.

Figure 7:
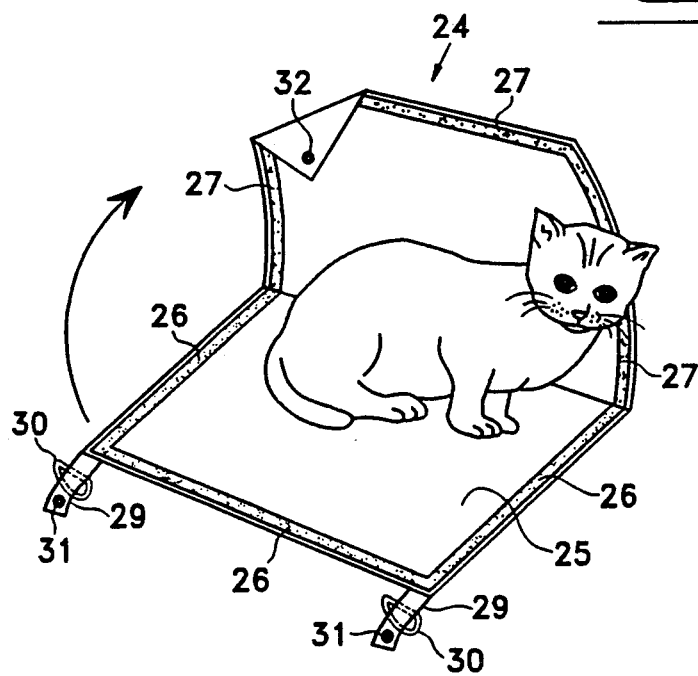
FIG. 7 shows an animal standing on another embodiment of the device of the present invention which is spread out on a flat surface and ready to be closed about the animal.
Figure 8:
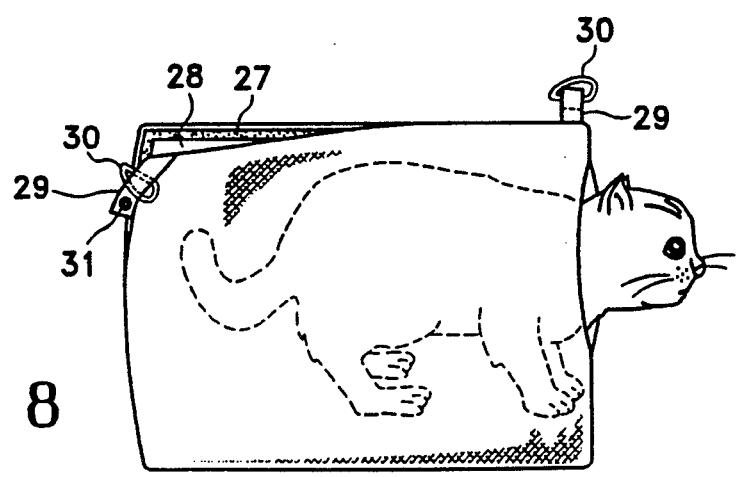
FIG. 8 shows the device of FIG. 7 with the animal inside and the device partially opened for treatment of the animal.

To use the blanket case 24, the blanket 25 is fully opened onto a flat surface with the liner facing upward. The animal is placed along the longitudinal center with its head extending over the end of the blanket 25 and the two halves are brought together. (FIG. 7) The two mating connector strips 26 and 27 are thereafter brought into contact so that they coact to quickly close and seal the case 24 all around, except where the animal's neck extends without the case 24. The animal is now completely enclosed in the blanket case 24 except for its head (FIG. 8). The top of the case may be opened and closed as needed by separating the strips of first mating connector 26 and second mating connector 27 along a portion 28 of the seal as needed.

A tab 29 holding a D-ring 30 is affixed to each of the two corners of one half of the blanket 25. A snap fastener 31 is affixed to the inside end of each tab 29. The corresponding snap receiver 32 is affixed to each outside corner of the other half of the blanket 25. When the blanket case 24 is used as in FIG. 7, the snaps can be fastened and a carrying strap can be used in communication with the D-rings 30.

The blanket 25 can also be used by placing it over the animal and bringing the mating connector strips 26 and 27 together under the animal. Access to the animal's body is thereafter gained by opening a portion of the seal at the back end of the case 24. A dual release zipper can be used in place of the mating connector strips when the blanket 25 is to be used in this fashion.

The blanket case 24 may not be used to hold a complete bath for the animal, but a smaller quantity of solution or a powder medication can be applied to the animal using this embodiment. When not in use, the blanket case 24 can be folded flat and easily stored. This embodiment provides a quick and easy means to restrain an animal and to protect the handler from being scratched or clawed.

The blanket case 24 can be constructed of the same materials as the case of the first embodiment 10. If it is desired to be able to see through the case of the present invention, either embodiment can be manufactured of a heavyweight but flexible transparent polymeric material.

While two embodiments of the present invention have been illustrated and described in detail, it is to be understood that this invention is not limited thereto and may be otherwise practiced within the scope of the following claims.

I claim:

1. An animal treatment and handling device comprising:
    a case formed from a substantially flexible material and having a front opening and a back panel to which a tubular wall portion is integrally and fixedly connected;
    said case being longitudinally disposed and having a top and a bottom and a hollow interior and having an interior and an exterior surface;
    said front opening having a right front edge and a left front edge;
    a strip of first mating connector located along the interior surface adjacent the right front edge and a strip of second mating connector, for coaction with said strip of first mating connector, located along the interior surface adjacent the left front edge, said strips forming a first closing means;
    a second closing means disposed along the lower two thirds of the periphery of the two front edges for a more secure closing thereof; and
    a longitudinally oriented slit centrally disposed along the top of the case, said slit having a first side and a second side, and said slit having a strip of first mating connector affixed along the first side and a strip of second mating connector, for coaction with said strip of first mating connector, affixed along the second side, such that said slit can be closed to maintain the integrity of the case and thereafter opened for easy access to the interior of the case.

2. An animal treatment and handling device comprising:

a cylindrical case formed from a substantially flexible material and having a front opening and a back panel to which a tubular wall portion is integrally and fixedly connected;

said case being longitudinally disposed and having a top and a bottom and a hollow interior and having an interior and an exterior surface;

said front opening having a right front edge and a left front edge;

a strip of hook-type fastener located along the interior surface adjacent the right front edge and a strip of loop-type fastener, for coaction with said strip of hook-type fastener, located along the interior surface adjacent the left front edge, said strips forming a first closing means;

a second closing means disposed along the lower two thirds of the periphery of the two front edges for a more secure closing thereof;

a longitudinally oriented slit centrally disposed along the top of the case, said slit having a first side and a second side and said slit having a strip of hook-type fastener affixed along the first side and a strip of loop-type fastener, for coaction with said strip of hook-type fastener, affixed along the second side such that said slit can be closed to maintain the integrity of the case and thereafter opened for easy access to the interior of the case;

two loops fixedly attached at opposing ends of the top exterior surface of the case; and two D-rings, one located within each of said loops, for communication with a carrying strap.

3. An animal treatment and handling device as in claim 2 wherein a semirigid binding is interposed between the back panel and the tubular wall portion.

4. An animal treatment and handling device as in claim 2 wherein the substantially flexible material forming the case is constructed of an outer layer and an inner layer.

5. An animal treatment and handling device as in claim 4 wherein the outer layer is made of a material selected from the group consisting of a heavy cotton fabric, a heavy nylon fabric and a plastic.

6. An animal treatment and handling device as in claim 4 wherein the inner layer is made of a heavy gauge waterproof substance.

7. An animal treatment and handling device as in claim 2 wherein the substantially flexible material forming the case is a heavy gauge transparent waterproof polymeric substance.

8. An animal treatment and handling device as in claim 2 wherein the hook-and-loop type fastener strips are of the type commonly known as Velcro.

9. An animal treatment and handling device as in claim 2 wherein the second closing means is a zipper.

10. An animal treatment and handling device as in claim 2 wherein the second closing means is a series of snap fasteners, the snaps being affixed to the periphery of the left front edge of the case and the snap receivers, for coaction with said snaps, being affixed to the periphery of the right front edge of the case.

* * * * *